(12) United States Patent
Charles et al.

(10) Patent No.: US 11,634,031 B2
(45) Date of Patent: Apr. 25, 2023

(54) WORK VEHICLE WITH FLUID GAUGE ACCESSIBLE FROM THE GROUND

(71) Applicant: CNH Industrial America LLC, New Holland, PA (US)

(72) Inventors: Jacob Charles, Akron, PA (US); Christopher Hill, Riverside, IL (US); Jerry L. Brinkley, Woodridge, IL (US); Michelle Lass Sterrett, Chicago, IL (US)

(73) Assignee: CNH Industrial America LLC, New Holland, PA (US)

(*) Notice: Subject to any disclaimer, the term of this patent is extended or adjusted under 35 U.S.C. 154(b) by 406 days.

(21) Appl. No.: 16/794,847

(22) Filed: Feb. 19, 2020

(65) Prior Publication Data

US 2021/0252980 A1 Aug. 19, 2021

(51) Int. Cl.
*B60K 37/02* (2006.01)

(52) U.S. Cl.
CPC ........ *B60K 37/02* (2013.01); *B60K 2370/154* (2019.05); *B60K 2370/33* (2019.05)

(58) Field of Classification Search
CPC ................ B60K 37/02; B60K 2370/33; B60K 2370/154
USPC .......................................................... 116/286
See application file for complete search history.

(56) References Cited

U.S. PATENT DOCUMENTS

| | | | |
|---|---|---|---|
| 5,757,595 A | 5/1998 | Ozawa et al. | |
| 7,478,492 B2 | 1/2009 | Madonia | |
| 8,019,500 B2 | 9/2011 | Oesterling et al. | |
| 8,083,260 B2 | 12/2011 | Haynes | |
| 8,179,245 B2 * | 5/2012 | Chander | B60Q 9/00 340/455 |
| 8,606,430 B2 | 12/2013 | Seder et al. | |
| 2010/0238006 A1 | 9/2010 | Grider et al. | |
| 2015/0032328 A1 | 1/2015 | Healey et al. | |
| 2015/0325061 A1 | 11/2015 | Gerstenberg et al. | |
| 2017/0197544 A1 | 7/2017 | Wang et al. | |
| 2018/0072252 A1 | 3/2018 | Collins | |
| 2018/0186309 A1 | 7/2018 | Batten et al. | |
| 2019/0033119 A1 * | 1/2019 | Lease | B60K 15/03006 |
| 2020/0348751 A1 * | 11/2020 | Beineke | G06F 3/1423 |

FOREIGN PATENT DOCUMENTS

| | | |
|---|---|---|
| DE | 10 2014 010 663 A1 | 1/2015 |
| DE | 10 2015 223 673 A1 | 6/2017 |

* cited by examiner

*Primary Examiner* — Jack K Wang
(74) *Attorney, Agent, or Firm* — Rickard Demille; Rebecca Henkel

(57) ABSTRACT

A work vehicle includes: a chassis; an operator cab carried by the chassis; at least one fluid reservoir carried by the chassis; at least one fluid sensor disposed in the at least one fluid reservoir and configured to output a fluid level signal corresponding to a level of fluid in the at least one fluid reservoir; and a fluid display gauge carried by the chassis outside of the operator cab and operatively coupled to the at least one fluid sensor, the fluid display gauge including an activation region that is accessible from the ground. The fluid display gauge is configured to display the level of fluid in the at least one fluid reservoir upon the activation region being activated.

15 Claims, 2 Drawing Sheets

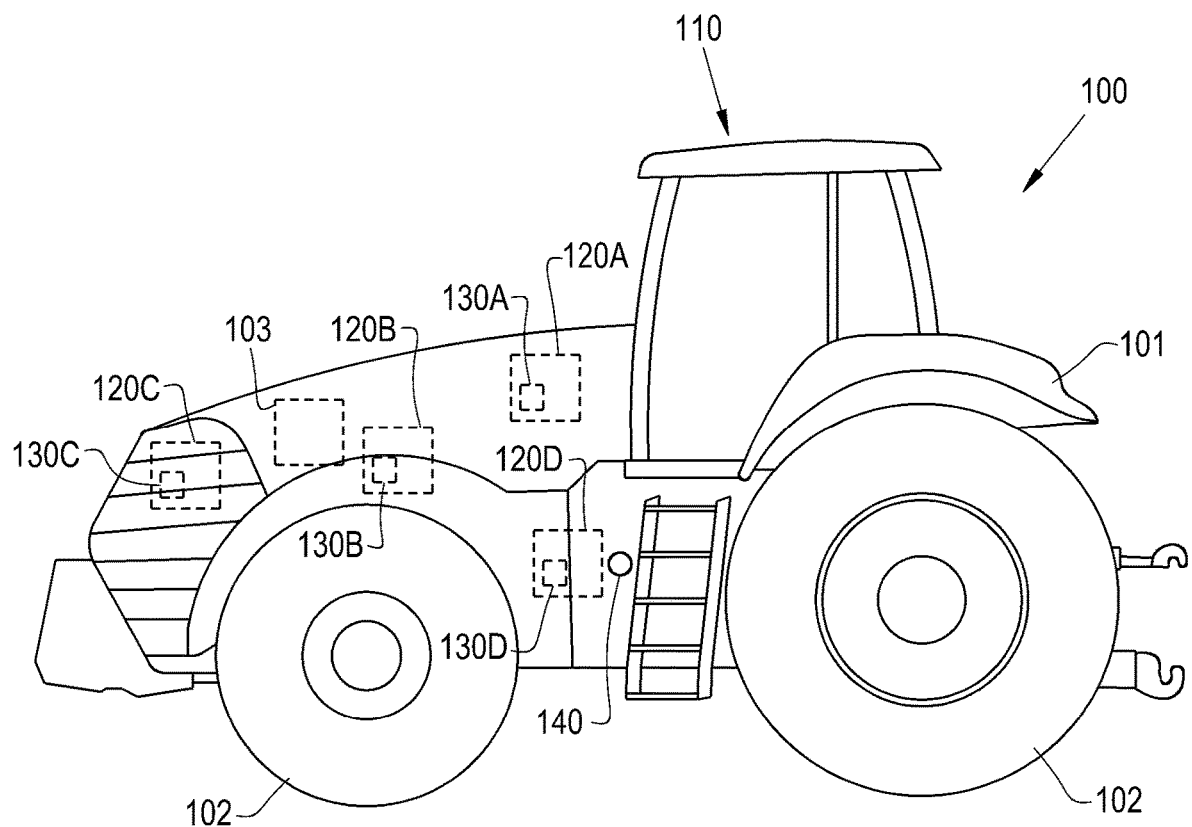
FIG. 1
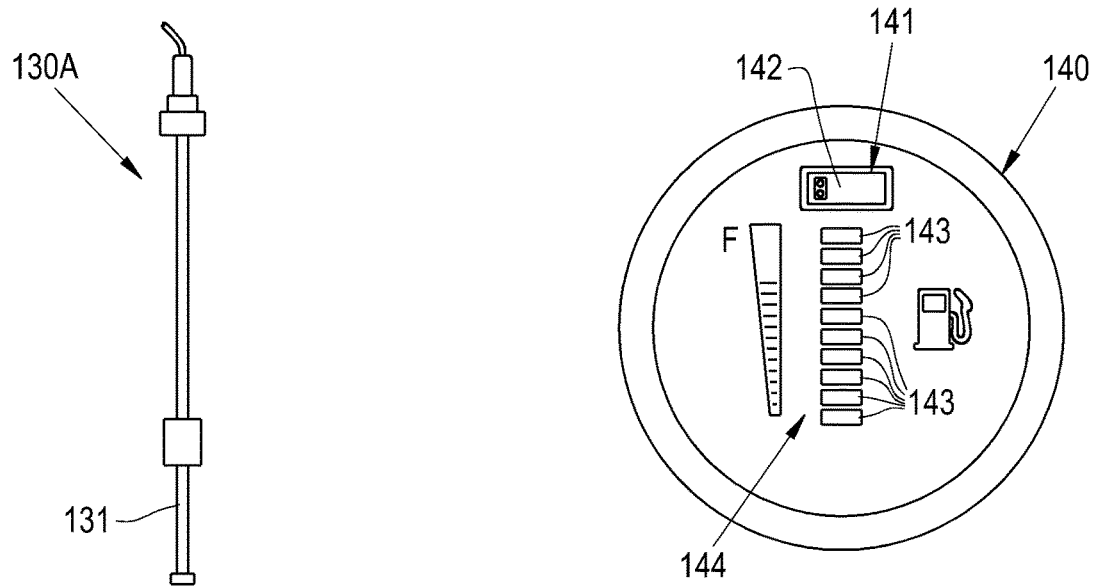
FIG. 2
FIG. 3

WORK VEHICLE WITH FLUID GAUGE ACCESSIBLE FROM THE GROUND

FIELD OF THE INVENTION

The present invention pertains to work vehicles and, more specifically, to work vehicles with fluid gauges.

BACKGROUND OF THE INVENTION

Work vehicles, such as tractors, have various components that require fluid to operate. The engine, for example, requires fuel and the hydraulic system requires hydraulic fluid. If there are insufficient levels of fluids in the work vehicle, the work vehicle may not operate as efficiently or at all. There are various ways to check the fluids in the work vehicle, such as dipping a "dip stick" in the fluids, but many are inconvenient, which leads to infrequent checking of the fluids.

What is needed in the art is a convenient way to check the fluid levels in a work vehicle.

SUMMARY OF THE INVENTION

Exemplary embodiments disclosed herein provide a work vehicle with a fluid display gauge that is accessible from the ground and can display one or more fluid levels of fluid in the work vehicle.

In some exemplary embodiments provided according to the present disclosure, a work vehicle includes: a chassis; an operator cab carried by the chassis; at least one fluid reservoir carried by the chassis; at least one fluid sensor disposed in the at least one fluid reservoir and configured to output a fluid level signal corresponding to a level of fluid in the at least one fluid reservoir; and a fluid display gauge carried by the chassis outside of the operator cab and operatively coupled to the at least one fluid sensor, the fluid display gauge including an activation region that is accessible from the ground. The fluid display gauge is configured to display the level of fluid in the at least one fluid reservoir upon the activation region being activated.

In some exemplary embodiments, a method of checking at least one fluid level of a work vehicle includes activating an activation region of a fluid display gauge while standing on the ground. The fluid display gauge is operatively coupled to at least one fluid sensor disposed in at least one fluid reservoir of the work vehicle. Activating the activation region includes contacting the activation region and causes the fluid display gauge to display the level of fluid in the at least one fluid reservoir.

One possible advantage that may be realized by exemplary embodiments disclosed herein is that the fluid display gauge is conveniently accessible from the ground so an operator may check one or more fluid levels of the vehicle prior to entering the operator cab and starting the vehicle.

Another possible advantage that may be realized by exemplary embodiments disclosed herein is that the operator does not need to manually check each individual fluid level, which can save a significant amount of time.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 1 illustrates a perspective view of an exemplary embodiment of a work vehicle including a fluid display gauge, provided in accordance with the present disclosure;

FIG. 2 illustrates a perspective view of an exemplary embodiment of a fluid sensor, provided in accordance with the present disclosure;

FIG. 3 illustrates a close-up view of the fluid display gauge of FIG. 1, provided in the form of an analog display gauge;

DETAILED DESCRIPTION OF THE INVENTION

Figure 4:
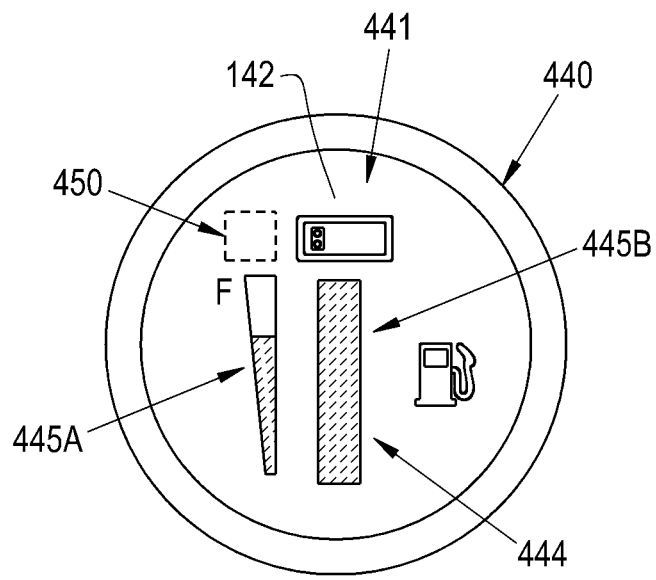
FIG. 4 illustrates a close-up view of an exemplary embodiment of a fluid display gauge that may be incorporated in the work vehicle of FIG. 1, provided in the form of a digital display gauge.

Referring now to the drawings, and more particularly to FIG. 1, an exemplary embodiment of a work vehicle 100, illustrated in the form of a tractor, provided according to the present disclosure is illustrated. The work vehicle 100 includes a chassis 101 and an operator cab 110 that is carried by the chassis 101. Various controls for the work vehicle 100 may be placed in the operator cab 110, as is known. The chassis 101 may be supported by multiple pairs of wheels 102, which are linked to an engine 103 by a transmission to propel the work vehicle 100. It should be appreciated that while the work vehicle 100 is illustrated and described as being in the form of a tractor, the work vehicle provided according to the present disclosure can take other forms, including but not limited to an agricultural harvester, a skid loader, a dozer, etc.

To operate, various components of the work vehicle 100 require different fluids. To provide fluid to the various components, the work vehicle 100 includes at least one fluid reservoir, illustrated as four fluid reservoirs 120A, 120B, 120C, 120D. Each of the fluid reservoirs 120A, 120B, 120C, 120D may hold a different fluid. Exemplary fluids that may be held in the fluid reservoirs include, but are not limited to, fuel, transmission fluid, hydraulic fluid, and diesel exhaust fluid. In this sense, the fluid reservoirs 120A, 120B, 120C, 120D may include a fuel reservoir, a transmission fluid reservoir, a hydraulic fluid reservoir, and/or a diesel exhaust fluid reservoir. It should be appreciated that the foregoing number of fluid reservoirs and the fluid that can be held in each fluid reservoir 120A, 120B, 120C, 120D are exemplary only, and a different number of fluid reservoirs and the type of fluids held in the reservoirs may be adjusted as desired according to the present disclosure.

To determine how much fluid is in each of the fluid reservoirs 120A, 120B, 120C, 120D, and referring now to FIG. 2 as well, a fluid sensor 130A, 130B, 130C, 130D may be disposed in each of the fluid reservoirs 120A, 120B, 120C, 120D, with each fluid sensor 130A, 130B, 130C, 130D being configured to output a fluid level signal corresponding to a level of fluid in the respective fluid reservoir 120A, 120B, 120C, 120D. An exemplary fluid sensor 130A is illustrated in FIG. 2 and described further herein, but it should be appreciated that the fluid sensors 130A, 130B, 130C, 130D can be configured in a variety of ways to sense the fluid level in each of the fluid reservoirs 120A, 120B, 120C, 120D. As illustrated in FIG. 2, the fluid sensor 130A may include a probing portion 131 that, when the fluid sensor 130A is disposed in the fluid reservoir 120A, will be at least partially immersed in fluid held in the fluid reservoir 120A, if any fluid remains in the fluid reservoir 120A. Many different type of fluid sensors are known, so further description of the fluid sensor 130A is omitted for brevity.

In known work vehicles, readings from the fluid sensors may be presented in the operator cab of the vehicle. While this is convenient during operation when the operator is sitting in the cab, it is inconvenient when the operator wishes to know the fluid levels before getting in the operator cab. The operator may, for example, wish to know the fluid levels before getting in the operator cab so the operator is able to determine what fluid(s) need to be refilled prior to getting in the cab to begin operation.

To address some of the previously described issues, and referring now to FIG. 3 as well, the work vehicle 100 includes a fluid display gauge 140 that is carried by the chassis 101 outside of the operator cab 110 and operatively coupled to the fluid sensor(s) 130A, 130B, 130C, 130D. The fluid display gauge 140 includes an activation region 141 that is accessible from the ground. As used herein, the activation region 141 is "accessible from the ground" in the sense that an operator may physically contact or otherwise interact with the activation region 141 while standing on the ground, i.e., the operator does not need to climb up into the work vehicle 100 to activate the activation region 141. Upon the activation region 141 being activated by, for example, an operator pressing on the activation region 141, the fluid display gauge displays the level of fluid(s) in the fluid reservoirs 120A, 120B, 120C, 120D based on the signal(s) from the coupled fluid sensor(s) 130A, 130B, 130C, 130D. In embodiments where multiple fluid sensors 130A, 130B, 130C, 130D are operatively coupled to the fluid display gauge 140, activating the activation region 141 can cause the fluid display gauge 140 to display the level of fluid in each of the respective fluid reservoirs 120A, 120B, 120C, 120D. Thus, the fluid display gauge 140 allows an operator to conveniently assess the level of fluid in one or more of the fluid reservoirs 120A, 120B, 120C, 120D from the ground without having to get into the operator cab 110.

In some embodiments, the activation region 141 comprises a button 142 that is activated upon being depressed. The fluid display gauge 140 may includes a button 142 that is manually depressed to activate when, for example, the fluid display gauge 140 is an analog display gauge. In some embodiments, the activation region 141 and the button 142 may be vertically located no more than 6 feet from the ground so a height of the activation region 141 and the button 142 relative to the ground is at most 6 feet, which is readily accessible by the average operator. The button 142 may be any type of button, e.g., flush with a surface of the activation region 140, extending from the activation region 140, etc. Upon depressing the button 142, the fluid display gauge 140 can query the fluid sensors 130A, 130B, 130C, 130D to output their respective fluid level signals.

To provide an operator with a sense of the fluid levels, the fluid display gauge 140 may include a plurality of lights 143. A number of the lights that are lit upon activating the activation region 141 can correspond to the level of fluid in the fluid reservoir(s) 120A, 120B, 120C, 120D. For example, as illustrated in FIG. 3, there can be ten lights 143 associated with the level of fuel held in one of the fluid reservoirs 120A, 120B, 120C, 120D. If the fluid reservoir holding the fuel is completely full, all of the lights 143 can be lit upon activating the activation region 141 to signify this. If, however, the level of fuel in the fluid reservoir drops to 60%, only six of the lights 143 may be lit upon activating the activation region 141. The number of lights 143 that are lit when the activation region 141 is activated may be controlled by, for example, an output voltage and/or current from the respective fluid sensor that is received by the fluid display gauge 140 when the activation region 141 is activated.

The lights 143 may be part of a display region 144 of the fluid display gauge 140. The display region 144 is the region of the fluid display gauge 140 that displays the level of fluid in the fluid reservoir(s) 120A, 120B, 120C, 120D upon the activation region 141 being activated. In the embodiment shown in FIGS. 1 and 3, the display region 144 and the activation region 141 are integrated together, i.e., in close proximity to one another. However, it should be appreciated that the activation region 141 and the display region 144 may be located remotely from one another. For example, the activation region 141 may be at a location that is accessible from the ground while the display region 144 is not accessible from the ground. In such an embodiment, the display region 144 may be connected to, for example, the operator cab 110 and have a sufficient size to allow an operator to see the display region 144 while activating the activation region 141. It should thus be appreciated that the display region 144 and the activation region 141 do not need to be integrated together, or even in close proximity, according to the present disclosure.

In some embodiments, and referring now to FIG. 4, the fluid display gauge is configured as a digital display gauge 440. In such an embodiment, a controller 450 may be operatively coupled to the fluid sensor(s) 130A, 130B, 130C, 130D and a display region 444 of the fluid display gauge 440. The controller 450 may be, for example, a part of the fluid display gauge 440 or, alternatively, a separate controller. The controller 450 may also be operatively coupled to an activation region 441 of the fluid display gauge 440, which is accessible from the ground. The activation region 441 may include a button, as previously described, or may be a digital activation region such as, for example, a capacitive touch region. When the activation region 441 is activated, such as by pressing the activation region 441, the coupled fluid sensor(s) 130A, 130B, 130C, 130D may be queried to send respective fluid level signals to the controller 450. The controller 450 may receive the fluid level signal(s) and is configured to output a fluid level display signal to the display region 444 that corresponds to the level of fluid in one or more of the fluid reservoirs 120A, 120B, 120C, 120D. The display region 444 is configured to display one or more fluid level icons 445A, 445B upon receiving the fluid level display signal(s), with the fluid level icons 445A, 445B corresponding to the level of fluid in the respective fluid reservoirs. It should be appreciated that while the fluid level icons 445A, 445B are illustrated as graphical icons, in some embodiments the fluid level icons 445A, 445B are alphanumeric characters that correspond to, for example, qualitative levels of fluid in the fluid reservoirs, e.g., "OK," "FULL," "LOW", etc., and/or quantitative levels of fluid in the fluid reservoirs, e.g., "100%", "82%," "15%", etc. It should thus be appreciated that the fluid display gauges 140, 440 provided according to the present disclosure can be configured in a variety of ways to alert an operator to the level of fluid in the fluid reservoirs 120A, 120B, 120C, 120D.

From the foregoing, it should be appreciated that work vehicles 100 provided according to the present disclosure include a fluid display gauge 140, 440 that allows an operator to conveniently check fluid levels of the work vehicle 100 without having to get in the operator cab 110. The operator can thus determine whether any of the fluids of the work vehicle 100 should be refilled without having to climb in and out of the operator cab 110, which can increase operator safety. Further, the fluid levels can be checked without the risk of an operator inadvertently starting the work machine 100 to check the fluid levels. Thus, work vehicles 100 provided according to the present disclosure allow operators to easily and conveniently check fluid levels of the work vehicle 100.

Figure 5:
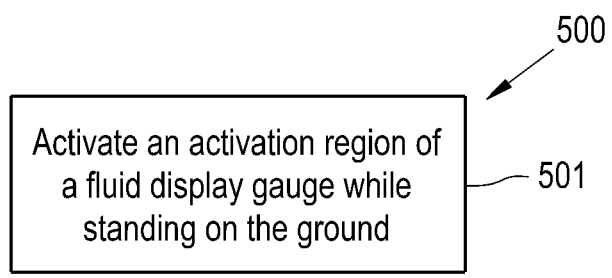
FIG. 5 is a flow chart illustrating an exemplary embodiment of a method of checking one or more fluid levels of a work vehicle, provided in accordance with the present disclosure.

Referring now to FIG. 5, an exemplary embodiment of a method 500 of checking at least one fluid level of a work vehicle, such as the previously described work vehicle 100, is illustrated. The method 500 includes activating 501 an activation region 141, 441 of a fluid display gauge 140, 440 while standing on the ground. The fluid display gauge 140, 440 is operatively coupled to at least one fluid sensor 130A, 130B, 130C, 130D disposed in at least one fluid reservoir 120A, 120B, 120C, 120D of the work vehicle 100. Activating the activation region 141, 441 includes contacting the activation region 141, 441 and causes the fluid display gauge 140, 440 to display the level of fluid in the at least one fluid reservoir 120A, 120B, 120C, 120D.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A work vehicle, comprising:
a chassis;
an operator cab carried by the chassis;
a plurality of fluid reservoirs carried by the chassis, each of the fluid reservoirs holding a respective fluid to be provided to a component of the work vehicle;
a plurality of fluid sensors, each fluid sensor being disposed in a respective one of the fluid reservoirs and configured to output a fluid level signal corresponding to a level of fluid in the respective fluid reservoir; and
a fluid display gauge carried by the chassis outside of the operator cab and operatively coupled to the plurality of fluid sensors, the fluid display gauge comprising an activation region that is accessible from the ground, the fluid display gauge being configured to display the level of fluid in each of the fluid reservoirs upon the activation region being activated.

2. The work vehicle of claim 1, wherein the activation region comprises a button that is activated upon being depressed.

3. The work vehicle of claim 1, wherein the plurality of fluid reservoirs comprises at least two of a fuel reservoir, a transmission fluid reservoir, a hydraulic fluid reservoir, and a diesel exhaust fluid reservoir.

4. The work vehicle of claim 1, wherein the fluid display gauge is configured as an analog display gauge.

5. The work vehicle of claim 4, wherein the fluid display gauge comprises a plurality of lights, wherein a number of the lights that are lit upon activating the activation region corresponds to the level of fluid in the respective fluid reservoir.

6. The work vehicle of claim 1, further comprising a controller coupled to the plurality of fluid sensors and a display region of the fluid display gauge, the fluid display gauge being configured as a digital display gauge and the controller being configured to output a fluid level display signal to the display region that corresponds to the level of fluid in each of the fluid reservoirs, the display region being configured to display a fluid level icon upon receiving the fluid level display signal.

7. The work vehicle of claim 1, wherein the activation region is vertically located no more than 6 feet from the ground.

8. The work vehicle of claim 1, wherein the activation region of the fluid display gauge is integrated with a display region of the fluid display gauge.

9. A method of checking fluid levels of fluids to be provided to at least one component of a work vehicle, the method comprising:
activating an activation region of a fluid display gauge while standing on the ground, the fluid display gauge being operatively coupled to a plurality of fluid sensors, each of the fluid sensors being disposed in in a respective fluid reservoir of a plurality of fluid reservoirs of the work vehicle, wherein activating the activation region comprises contacting the activation region and causes the fluid display gauge to display the level of fluid in each of the fluid reservoirs.

10. The method of claim 9, wherein the activation region comprises a button and the activating comprises depressing the button.

11. The method of claim 9, wherein the plurality of fluid reservoirs comprises at least two of a fuel reservoir, a transmission fluid reservoir, a hydraulic fluid reservoir, or a diesel exhaust fluid reservoir.

12. The method of claim 9, wherein the fluid display gauge is configured as an analog display gauge.

13. The method of claim 12, wherein the fluid display gauge comprises a plurality of lights, wherein activating the activation region causes a number of the lights to be lit that corresponds to the level of fluid in the respective fluid reservoir.

14. The method of claim 9, wherein the activation region is vertically located no more than 6 feet from the ground.

15. The method of claim 9, wherein the activation region of the fluid display gauge is integrated with a display of the fluid display gauge.

* * * * *